Jan. 16, 1968   J. W. I. HEIJNIS   3,363,577
SHAFT SEALING FOR SPINNING PUMP
Filed Sept. 2, 1965
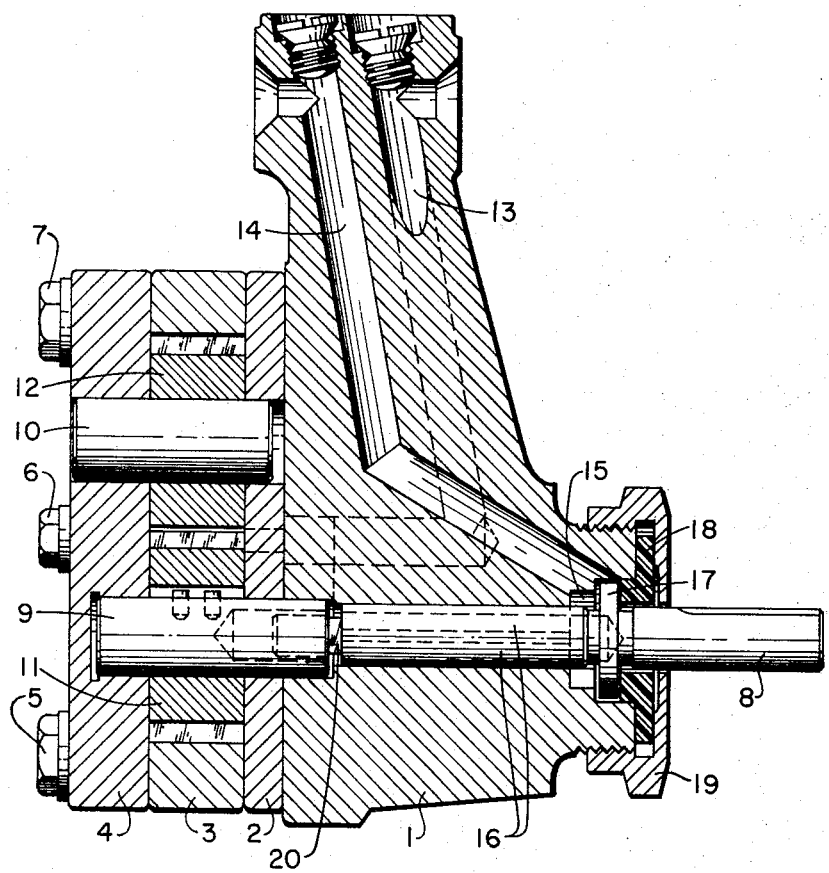
INVENTOR.
JAMES WATT IJSBRAND HEIJNIS
BY
Francis W. Young
ATTORNEY United States Patent Office 3,363,577
Patented Jan. 16, 1968

3,363,577
SHAFT SEALING FOR SPINNING PUMP
James Watt Ijsbrand Heijnis, Arnhem, Netherlands, assignor to American Enka Corporation, Enka, N.C., a corporation of Delaware
Filed Sept. 2, 1965, Ser. No. 484,645
Claims priority, application Netherlands, Sept. 16, 1964, 64—10,753
5 Claims. (Cl. 103—126)

ABSTRACT OF THE DISCLOSURE

A pump wherein a drive shaft thereof is adapted to be lubricated by a fluid being pumped comprising a casing having a plurality of fluid-confining conduits with at least one conduit directly communicating to a fluid-confining cavity surrounding the drive shaft, said cavity further communicating with at least one fluid-confining groove which is parallel to the shaft and adapted to convey fluid from the cavity, along the shaft and to a chamber or cavity in which intermeshing gears rotate to thereby cause pressurized fluid displacement or flow through the conduits, cavities and grooves; a self-lubricating, sealing ring on said shaft interposed between a collar affixed to the shaft; and a threadably engaging cap member for securing the ring to the casing.

---

The present invention relates generally to gear pumps and more particularly to an improved sealing means for maintaining a fluid within the confines of the fluid path of a gear pump.

In prior art gear pumps having a shaft for driving the gears therein and multiple conduits containing fluid and communicating with said gears, it has been one practice to seal the point of entry of said shaft into the outer casing of said pump using a spring means. For example, a loose collar has been provided on the shaft and pressed into contact with a sealing ring using a spring device. Since the fluid in the pump is often in intimate contact with this type of sealing arrangement under high pressures, the sealing arrangement must frequently satisfy high sealing requirements. In addition to these requirements and in addition to the fact that the spring itself increases the complexity of pump construction, fluid leakage will often occur between the shaft and the collar loosely mounted thereon.

The present invention is designed to overcome the aforedescribed disadvantages and comprises, inter alia, a drive shaft with a collar fixed thereon and constructed to maintain leakage tight contact with a self-lubricating ring located between the collar and the casing of the pump. The self-lubricating ring is in turn clamped to the exterior of the casing of the pump and any leakage between the fluid path within the pump and that portion of the shaft extending outside the pump casing is prevented without the use of a spring.

As will become more fully apparent from a detailed description of the invention, the novel construction thereof offers not only the advantage of reduced cost but also that of fewer dead spots in the pump's fluid path than are present in similar prior art gear pumps. The so-called dead spots have been caused primarily by the spots in the coil of a spring not reached by the fluid pumped. The present invention is additionally advantageous in that the space normally required for a pressure spring is no longer existent. This space may now serve to accommodate a larger bearing for the pump's drive shaft in order to reduce the wear on the pump.

Accordingly, it is an object of the present invention to provide a new and improved gear pump.

It is another object of the invention to provide a gear pump having an improved sealing means for maintaining the fluid being pumped within the confines of the pump's fluid path.

It is a further object of the invention to provide a tightly sealed gear pump which is easy to construct and which exhibits a minimum of dead spots in the fluid path thereof.

These and other objects of the invention will become more fully apparent in the following description of a single embodiment thereof which is shown partly in section in the accompanying drawing.

Briefly described, the gear pump of the present invention comprises a casing having a plurality of conduits therein for carrying (conveying) fluid to be pumped, a gear means communicating with said conduits for pumping the fluid therein, and a drive shaft adapted to be coupled to an external source of power and extending into said casing for driving said gear means. The shaft has a collar fixedly mounted thereon which is pressed into contact with a ring of self-lubricating material affixed to one end of the casing of the pump. When the shaft rotates the collar is in constant forced frictional engagement with said ring thereby establishing a seal at the interface of the collar and ring for preventing fluid from passing to the outer portions of the casing during the normal operation of the pump.

Referring more in detail to the drawing, there are shown three flat plates 2, 3, and 4 mounted against a casing 1 by means of a series of bolts 5, 6, and 7, respectively. The gear pump is driven by a shaft 8 which is coupled for rotational drive to an external source of power (not shown) and extends into the casing 1. The shaft 8 is intercoupled to shaft 9 by means of a square pin 20 which is attached to the shaft 8 and fits into a square hole in the shaft 9. Parallel to the shaft 9 there is another shaft 10 which is securely mounted between plates 2 and 4.

Gear 11 is keyed as shown to shaft 9 for driving gear 12 whereas gear 12 is freely rotatable on shaft 10. Gears 11 and 12 have substantially the same thickness as the plate 3 and fit in a chamber formed by the plates 2, 3, and 4 as shown.

A pair of conduits 13 and 14 extends through the casing 1 and provides the supply and discharge or vice versa of the liquid to be pumped. The conduit 13 communicates directly with the two gears 11 and 12 at their point of intermesh whereas the conduit 14 enters into a cylindrical cavity 15 which is coaxial with the driving shaft 8. Fluid may pass from cavity 15 through lubricating grooves 16 into the space in which the gears 11 and 12 rotate, said grooves 16 being parallel to the shaft 8 and in open communication therewith, thereby enabling the fluid flowing through the grooves 16 to lubricate the shaft 8 during rotation thereof. The flow direction of the fluid in conduits 13 and 14 as well as in grooves 16 will, of course, be dependent upon the direction of rotation of shaft 8.

The drive shaft 8 is provided with a fixed collar 17 which loosely fits in the cavity 15. The collar 17 has one face thereof in sliding contact with a self-lubricating ring 18. The face of the lubricating ring 18 which is in contact with the collar 17 is slightly concave and conical. As a result of this particular type of construction, the collar 17 and the ring 18 are in contact initially along a line. Consequently a relatively high pressure per unit area is exerted in the vicinity of the outer periphery of the ring 18. After the ring has become worn by frictional sliding contact with the collar 17, the line contact gradually becomes a surface contact. Since the surfaces 17 and 18 experience wear during mutual sliding contact thereof, these surfaces eventually become substantially parallel and continue to maintain a seal between the outer portion of the casing 1 and the fluid paths within said casing. The ring 18 is provided with a flange or section of maximum diameter which is shown abutting the exterior portion of casing 1. This flange portion of ring 18 is secured to casing 1 by means of a cap screw 19 which threadably engages the exterior of the casing.

The shape of the ring 18 of self-lubricating material may be varied without departing from the scope of the present invention. For example, a flat ring may be used rather than a ring having a first portion of minimum diameter in contact with collar 17 and a second or flange portion of increased diameter. Using this latter type of construction however, the separate faces of the ring 18 which are in leakage tight contact with the casing and with the fixed collar respectively are axially displaced relative to each other. This design has the advantage in that the deformations of the ring 18 as a result of the liquid tight contact respectively with the casing and the collar are practically independent of each other. Thus, a more satisfactorily liquid-tight construction obtained.

Suitable materials for the ring 18 are graphite and bronze. However, when the pump is to be used for pumping a viscose, a polyamide ring will be found to be satisfactory as a self-lubricating material.

The sealing requirements for the above described sealing arrangement will always be dependent upon the pressure of the liquid flowing in conduits 13 and 15 within the gear pump. However, it will be observed that the pressure exerted on the collar 17 must at least be above atmospheric pressure if a proper seal is to be obtained, regardless of the direction of liquid flow within the gear pump.

It will also be observed that the conduits of above described embodiment of the invention contain practically no dead spots. Consequently if the above described gear pump is used for pumping a liquid such as viscose, the composition of which changes with time, there is no chance that the liquid portions of widely varied chemical compositions are obtained. Additionally, coagulation of portions of the pumped liquid will be prevented.

Obviously many modifications may be made in the light of the above teachings without departing from the spirit and scope of the above described invention. Therefore it should be understood that the invention is limited only by way of the following appended claims.

What is claimed is:
1. In a pump which in part comprises a casing having at least one conduit for conveying fluids under positive pressure, said casing also having an inlet and outlet for said conduit, intermeshing gears communicating with the conduit and adapted to be rotated by a drive shaft and wherein means is also provided for conveying at least a portion of the fluid to and along the shaft to said gears; the improvements comprising:
   (a) said shaft having a collar fixedly mounted thereon, and
   (b) a ring at least partially surrounding said shaft, engaging the collar and interposed between said collar and a means for securing the ring to the casing whereby a seal is established at abutting surfaces of the collar and the ring to prevent fluid leakage.

2. Apparatus of claim 1 wherein,
   (a) said ring consists of a first section projecting into a cylindrical cavity within said casing and into intimate contact with said collar,
   (b) a flange integral with said first section, and
   (c) a means for clamping said flange to said casing.

3. Apparatus of claim 2 wherein,
   (a) the surface of said ring abutting said collar is slightly concave and conical.

4. Apparatus of claim 3 wherein,
   (a) said ring is made of a polyamide.

5. A gear pump comprising:
   (a) a casing having a pair of conduits therein with one of the conduits establishing direct fluid communication to and along a drive shaft to,
   (b) gear means adjacent one of said conduits for pumping fluid therein,
   (c) said drive shaft extending into said casing for driving said gear means,
   (d) said shaft having a collar fixedly mounted thereon and adjacent the other of said pair of conduits, and
   (e) a ring of self-lubricating material having a flange portion affixed to said casing and an interior portion integral with said flange portion and in intimate contact with said collar, said collar and said ring being in mutual frictional engagement upon the rotation of said shaft whereby a seal is established between the exterior portion of said casing and the fluid path within said pump.

References Cited

UNITED STATES PATENTS

| | | | |
|---|---|---|---|
| 1,597,411 | 8/1926 | Kinney | 103—126 |
| 2,096,870 | 10/1937 | Vollenbroich | 103—126 |
| 2,316,565 | 4/1943 | Collier | 103—126 |
| 2,391,577 | 12/1945 | Larson | 103—126 |
| 2,420,622 | 5/1947 | Roth et al. | 103—126 |
| 2,967,487 | 1/1961 | Nagely | 103—126 |

DONLEY J. STOCKING, *Primary Examiner.*

WILBUR J. GOODLIN, *Examiner.*